(12) United States Patent
Chen et al.

(10) Patent No.: US 10,904,618 B2
(45) Date of Patent: *Jan. 26, 2021

(54) CUSTOMIZATION OF CONTENT FOR DIFFERENT AUDIENCES

(71) Applicant: Disney Enterprises, Inc., Burbank, CA (US)

(72) Inventors: Alexander Chen, La Canada Flintridge, CA (US); James Voris, San Gabriel, CA (US)

(73) Assignee: Disney Enterprises, Inc., Burbank, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/183,498

(22) Filed: Nov. 7, 2018

(65) Prior Publication Data

US 2019/0075360 A1 Mar. 7, 2019

Related U.S. Application Data

(63) Continuation of application No. 13/728,928, filed on Dec. 27, 2012, now Pat. No. 10,165,325.

(51) Int. Cl.
*H04N 21/454* (2011.01)
*H04N 21/485* (2011.01)

(52) U.S. Cl.
CPC ....... *H04N 21/4542* (2013.01); *H04N 21/485* (2013.01)

(58) Field of Classification Search
CPC .................. H04N 21/4542; H04N 21/485
See application file for complete search history.

(56) References Cited

U.S. PATENT DOCUMENTS

| 2007/0199040 A1* | 8/2007 | Kates | H04N 21/6587 725/134 |
| 2012/0060181 A1* | 3/2012 | Craner | H04N 21/4755 725/28 |
| 2012/0131475 A1* | 5/2012 | Bhogal | G06Q 10/10 715/753 |
| 2013/0251337 A1* | 9/2013 | Abecassis | H04N 21/47815 386/239 |

* cited by examiner

Primary Examiner — Rong Le
(74) Attorney, Agent, or Firm — Farjami & Farjami LLP

(57) ABSTRACT

A first version and a second version of audio visual content are provided via a disc, a web site or a mobile device application to consumers. The second version has audiovisual content removed from the first version that is not appropriate for a type of viewer, such as children. In addition, a menu is provided that allows a user to select the first version or the second version to play on a device. In addition to or instead of the second version, the menu may allow the user to customize the first version for an intended audience.

20 Claims, 5 Drawing Sheets

CUSTOMIZATION OF CONTENT FOR DIFFERENT AUDIENCES

RELATED APPLICATIONS

This patent application is a Continuation patent application of U.S. patent application Ser. No. 13/728,928, filed on Dec. 27, 2012, entitled CUSTOMIZATION OF CONTENT FOR DIFFERENT AUDIENCES, which is hereby incorporated by reference.

BACKGROUND

1. Field

This disclosure generally relates to the field of audiovisual content.

2. General Background

Audiovisual content (such as movies and video games) may be distributed with ratings to indicate whether or not the content is considered appropriate for a particular age range. For example, the rating "PG" from the Motion Picture Association of America (MPAA) indicates that parental guidance is recommended for a movie. The rating "PG-13" indicates that a movie is recommended for children that are thirteen years old or older. The rating "M" for video games means the games are recommended for mature audiences.

Some movies, such as animation movies, may be intended for children but have a few scenes that are inappropriate for young children. For example, a movie that is rated PG may only have a few scenes that contain violence or explicit language. As a result of a very small portion of the movie being inappropriate for young children, parents (and other caretakers such as older siblings, aunts, uncles, grandparents, teachers, etc.) may decide not to purchase tickets to a movie, a Blu-ray disc or DVD of the movie, an Internet-streamed version of the movie, or the like. Accordingly, content producers such as movie studios lose opportunities to sell content to certain consumers and collect additional revenue.

SUMMARY

A first version and a second version of audio visual content are provided via a disc, a web site or a mobile device application to consumers. The second version has audiovisual content removed from the first version that is not appropriate for a type of viewer, such as children. In addition, a menu is provided that allows a user to select the first version or the second version to play on a device. In addition to or instead of the second version, the menu may allow the user to customize the first version for an intended audience.

BRIEF DESCRIPTION OF THE DRAWINGS

The above-mentioned features of the present disclosure will become more apparent with reference to the following description and accompanying drawings, wherein like reference numerals denote like elements and in which:

FIG. 4A illustrates customization input as a preview indicium.

FIG. 4B illustrates customization input as a plurality of customization indicia such as an add indicium and a delete indicium.

DETAILED DESCRIPTION

Figure 1:
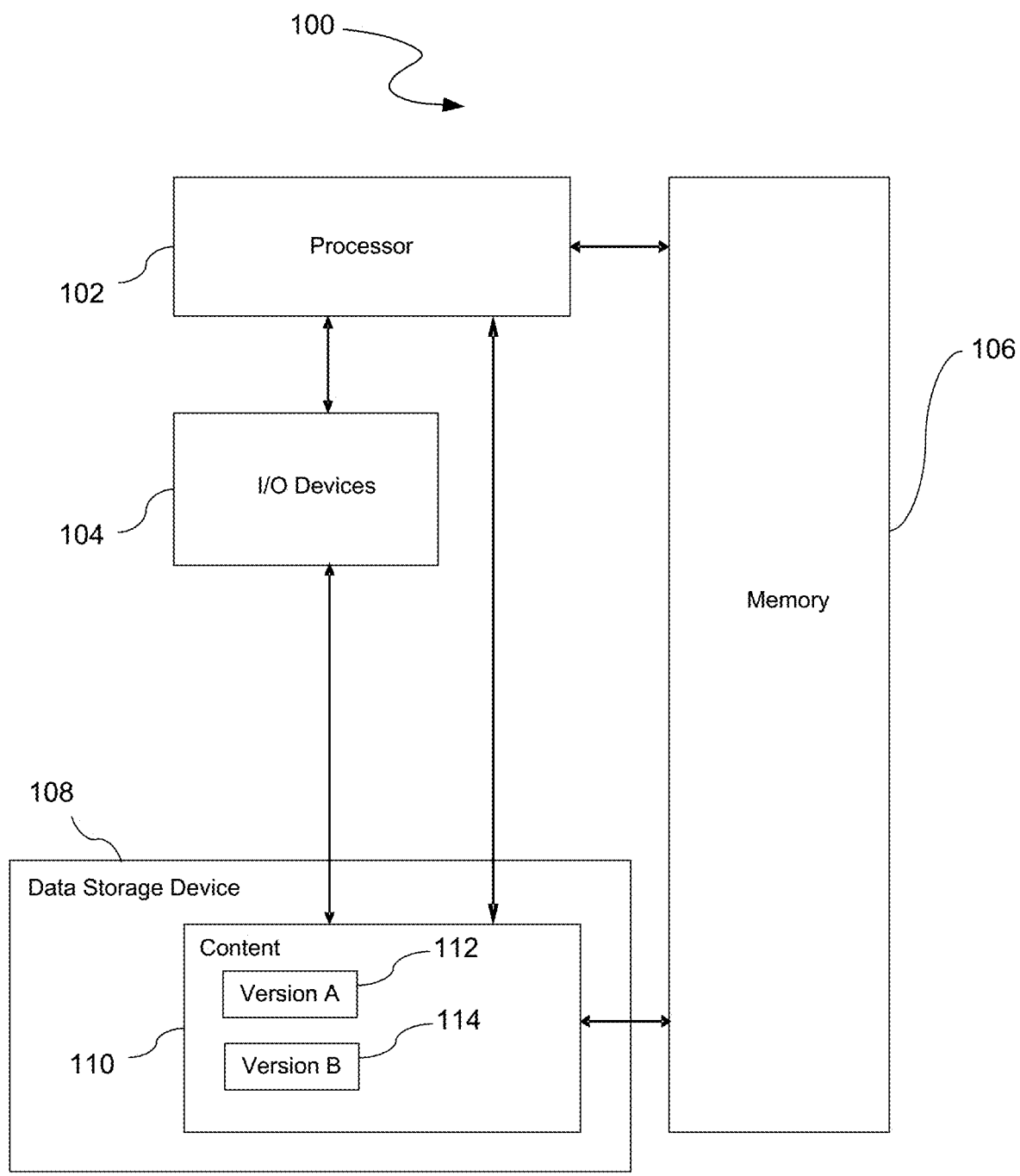
FIG. 1 illustrates a playback system that may be utilized to provide playback of content that has multiple versions, such as a version A and a version B.

FIG. 1 illustrates a content customization and playback system 100 that may be utilized to provide playback of content 110 that has multiple versions, such as a version A 112 and a version B 114. The content customization system 100 allows users to customize content 110 for one or more intended audiences. The content 110 may be a movie, television show, video, video game, mobile device application ("app"), song, or the like. Multiple versions 112, 114 of the content 110 may be stored, e.g., a first version 112 intended for a particular audience such as children, and a second version 114 intended for another particular audience such as adults. As an example, ratings may be utilized to distinguish between different versions, e.g., a first version is rated G, and a second version is rated PG. Both the rated G version and the rated PG version are stored so that a whole family may enjoy the content according to individual age suitability. For instance, parents may watch the rated G version with their children and may watch the rated PG version without their children.

The ratings discussed herein may be set by an industry organization, such as the MPAA, or by another entity, such as a movie studio, a group of parents, a social group, a school, a church or other religious organization, a doctor or other health professional, etc. Some health professionals may approve content that is appropriate to autistic children and/or adults.

Content 110 such as a movie may be purchased or rented via storage on a disk, downloading, or streaming to a computing device. The system 100 may include one or more of the following: a personal computer ("PC"), laptop, set top box, Blu-ray or DVD disc player, television, streaming device, smartphone, tablet device, entertainment system in a car, entertainment system in a plane, or the like.

Some Blu-ray DVDs have a directors' cut that allows a user to insert scenes that have been deleted from the theatrical version of the content into the movie for playback at a user's home. In contrast, one approach described herein removes scenes from the main version of the content. The removed scenes contain content that may be inappropriate for children or other types of viewers, in contrast to editors who remove scenes from a director's cut to shorten a movie or try to improve the story or flow of a movie for theatrical release.

In FIG. 1, the version A 112 and the version B 114 are illustrated for ease of illustration, but many other versions may also be stored, such as a G-rated version, PG-rated version, and PG-13 rated version of a movie. In one aspect, the system 100 is implemented utilizing a general purpose computing device or any other hardware equivalents. As illustrated, the system 100 comprises a processor 102, a memory 106, e.g., random access memory ("RAM") and/or read only memory (ROM), the content 110 having the version A 112 and the version B 114, a data storage device 108 that stores the content 110, and various input/output devices 104, e.g., audio/video outputs and audio/video inputs, a receiver, a transmitter, a speaker, a display, an image capturing sensor, e.g., those used in a digital still camera or digital video camera, a motion capture configuration, a clock, an output port, a user input device such as a remote control, a keyboard, a keypad, a mouse, and the like, or a microphone for capturing speech commands.

In one aspect, the data storage device 108 loads the content 110 from a computer readable storage medium, e.g., a magnetic or optical drive, diskette, or non-volatile memory, Blu-ray disc, DVD, CD-ROM, or the like. The content 110 is then operated by the processor 102 in the memory 106 of the system 100. In another aspect, the data storage device 108 is the computer readable storage medium. In yet another aspect, the content 110 is stored in the memory 106 rather than the data storage device 108. As such, the content 110 and associated data structures of the present disclosure may be stored on a computer readable medium, e.g., RAM memory, magnetic or optical drive or diskette or the like.

Various applications may be utilized by the playback system 100 to display available versions of the content 110 and receive a user selection and/or customization input of the content 110. As an example, a software application such as a mobile application, a desktop application, a web application, or the like may be utilized.

Figure 2:
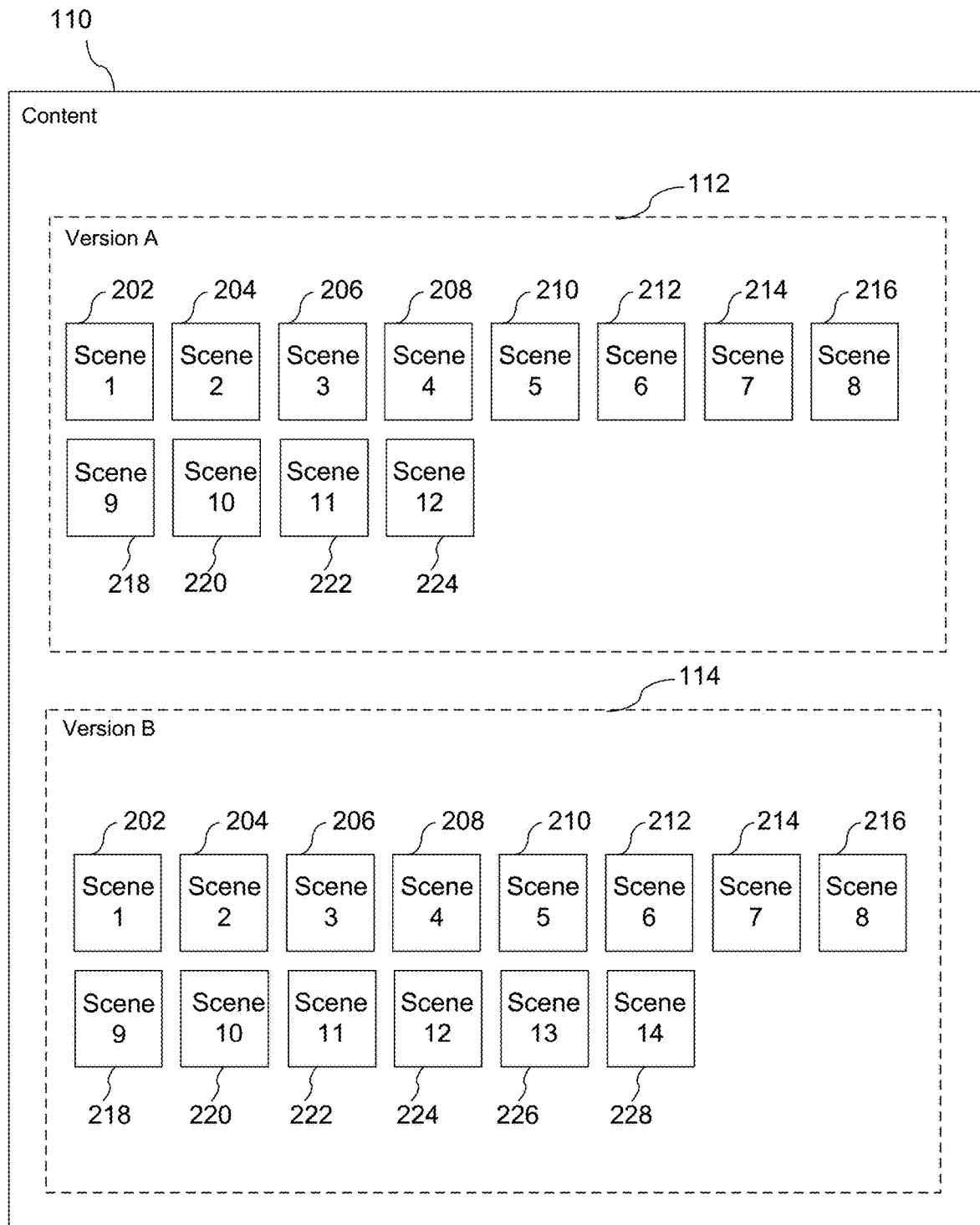
FIG. 2 illustrates an expanded depiction of the content illustrated in FIG. 1.

FIG. 2 illustrates an expanded depiction of the content 110 illustrated in FIG. 1. Each version of the content 110 includes a plurality of scenes. A scene from a video may be a complete consecutive sequence of images that are associated with each other. For example, a scene may be a part of a movie that involves common actors, location and/or objects. The movie may then proceed to a different scene that may have different actors and objects. Accordingly, content such as a movie generally has a plurality of different scenes.

As an example, the version A 112 has twelve scenes, e.g., a first scene 202, a second scene 204, a third scene 206, a fourth scene 208, a fifth scene 210, a sixth scene 212, a seventh scene 214, an eighth scene 216, a ninth scene 218, a tenth scene 220, an eleventh scene 222, and a twelfth scene 224. For instance, the version A 112 may be a rated G version of the content 110. As another example, the version B 114 has fourteen scenes, e.g., the first scene 202, the second scene 204, the third scene 206, the fourth scene 208, the fifth scene 210, the sixth scene 212, the seventh scene 214, the eighth scene 216, the ninth scene 218, the tenth scene 220, the eleventh scene 222, the twelfth scene 224, a thirteenth scene 226, and a fourteenth scene 228. For instance, the version B 114 may be a rated PG version of the content 110.

The version A 112 and the version B 114 have twelve scenes in common, but the version B 114 has two scenes, i.e., the thirteenth scene 226 and the fourteenth scene 228, that are not present in the version A 112. Those two scenes may contain content that is appropriate for older children, teenagers and adults, but not for young children. Accordingly, the version A 112 is rated G because the version A 112 does not include those two scenes, whereas the version B 114 is rated PG because the version B 114 includes those two scenes.

By having both the version A 112 and the version B 114 of the same content 110, users may select which version is most appropriate for an intended audience. For example, parents may watch the version A 112 with their children and watch the version B 114 without their children. As a result, audiences of various ages are able to enjoy content that is suitable for their respective age group.

The scenes that differ between the version A 112 and the version B 114 are illustrated at the end of the set of scenes for the version B 114 for ease of illustration. The differing scenes may appear anywhere within the version B 114. For instance, the differing scenes may be interspersed at different times within the content 110, e.g., a differing scene may be toward the beginning of the version B 114, another differing scene may be toward the middle of the version B 114, or the like.

Further, the version A 112 and the version B 114 may differ only by a single scene or by more than two scenes. The difference of two scenes is provided only for illustration purposes.

Figure 3:
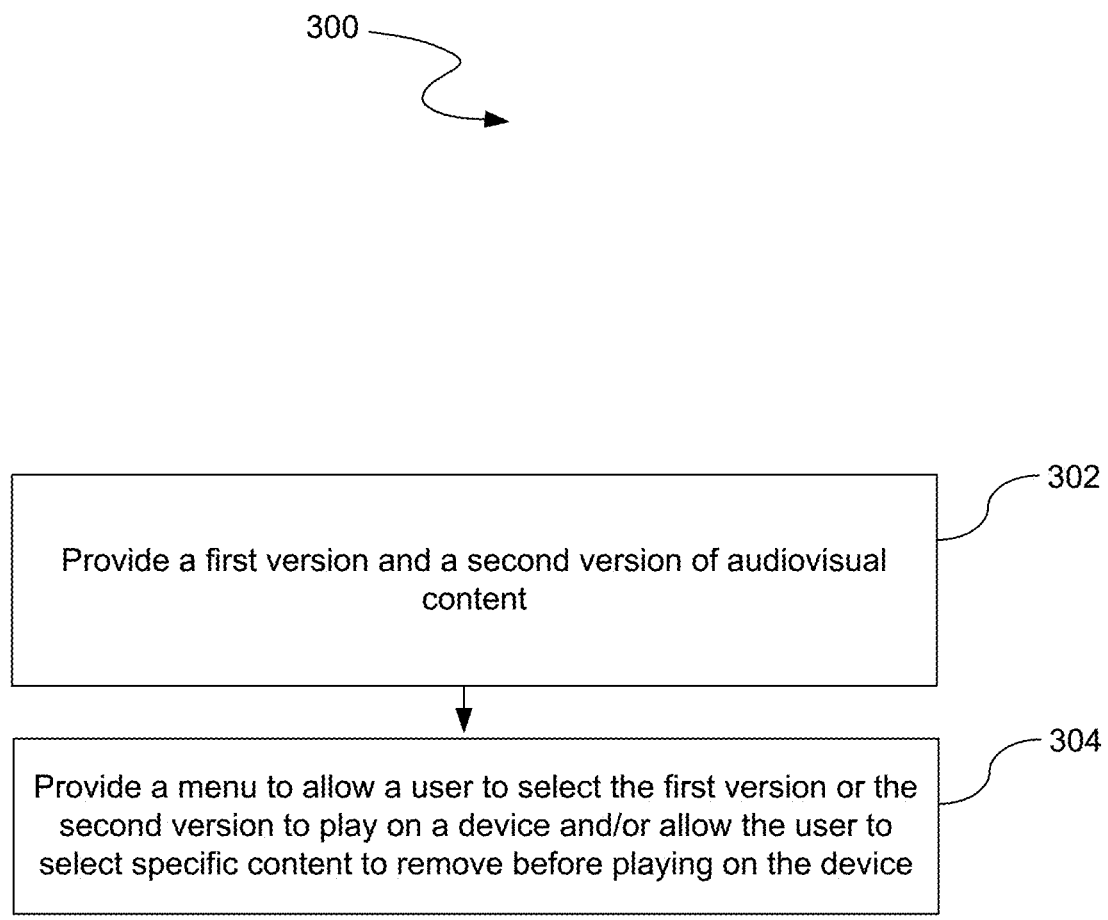
FIG. 3 illustrates a process that may be utilized to provide multiple versions of the content illustrated in FIGS. 1 and 2.

FIG. 3 illustrates a process 300 that may be utilized to provide multiple versions of the content 110 illustrated in FIGS. 1 and 2. At a process block 302, the process 300 provides a first version and a second version of audiovisual content. The second version has audiovisual content removed from the first version that is not appropriate for a type of viewer. Further, at a process block 304, the process 300 provides a menu to allow a user to select the first version or the second version to play on a device and/or allow the user to select specific content to remove before playing on the device. Blocks 302 and 304 may occur at one or more places, such as a movie studio, a content distribution facility and/or at a user's location.

Customization of Content by a User

In another aspect, the system 100 in FIG. 1 allows a user to select portions (e.g., scenes, audio parts of a movie or f a game, or the like) of the content 110 to display, so the user can determine and control which portions of the content 110 are appropriate for a certain age range. In addition to or instead of selecting from predetermined rated versions, the user determines for himself or herself which scenes should or should not be watched by a particular age group. In one configuration, a menu system is provided to allow the user to customize the content 110.

Figure 4A:
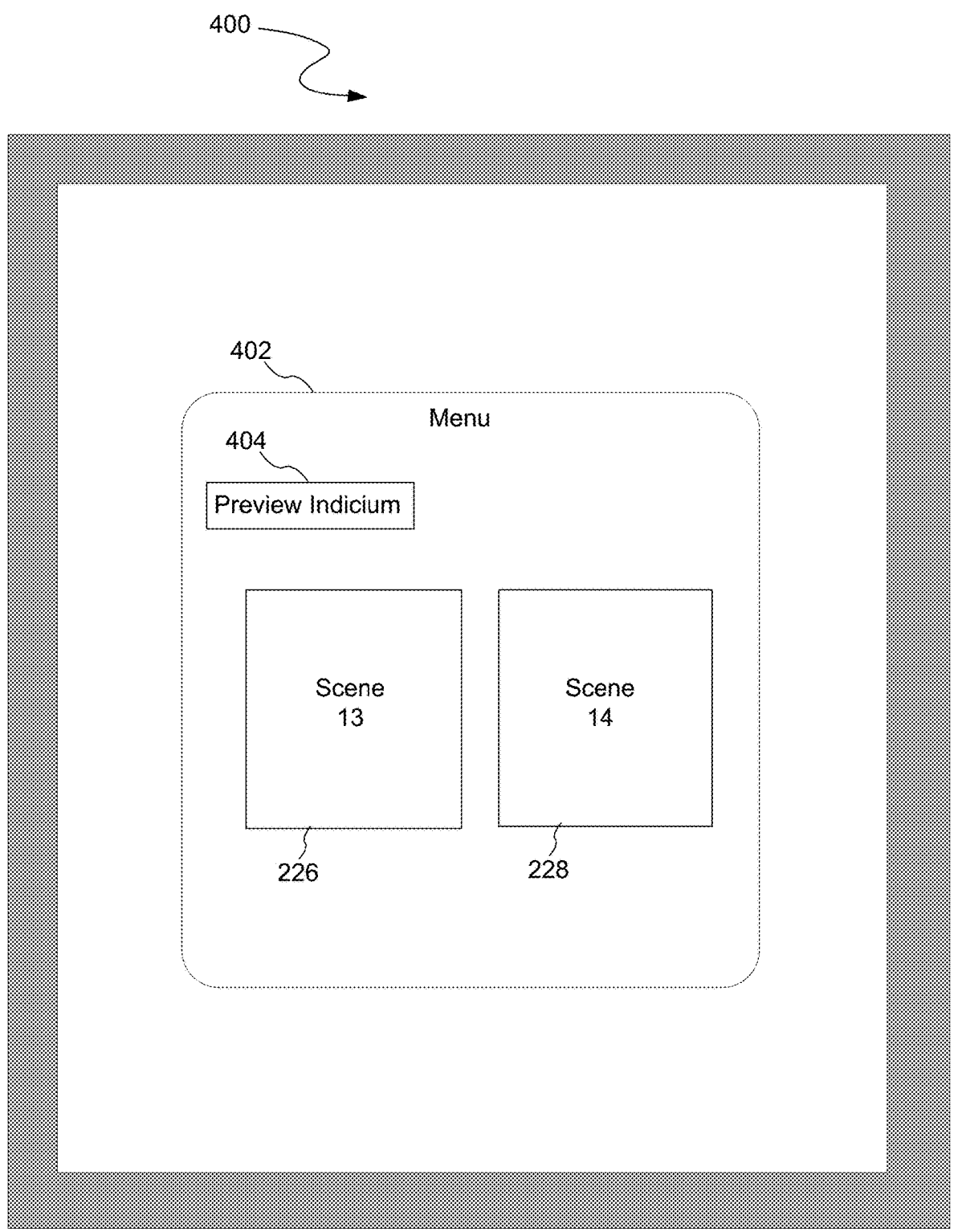
FIGS. 4A and 4B illustrate a display that is utilized to access a menu.
Figure 4B:
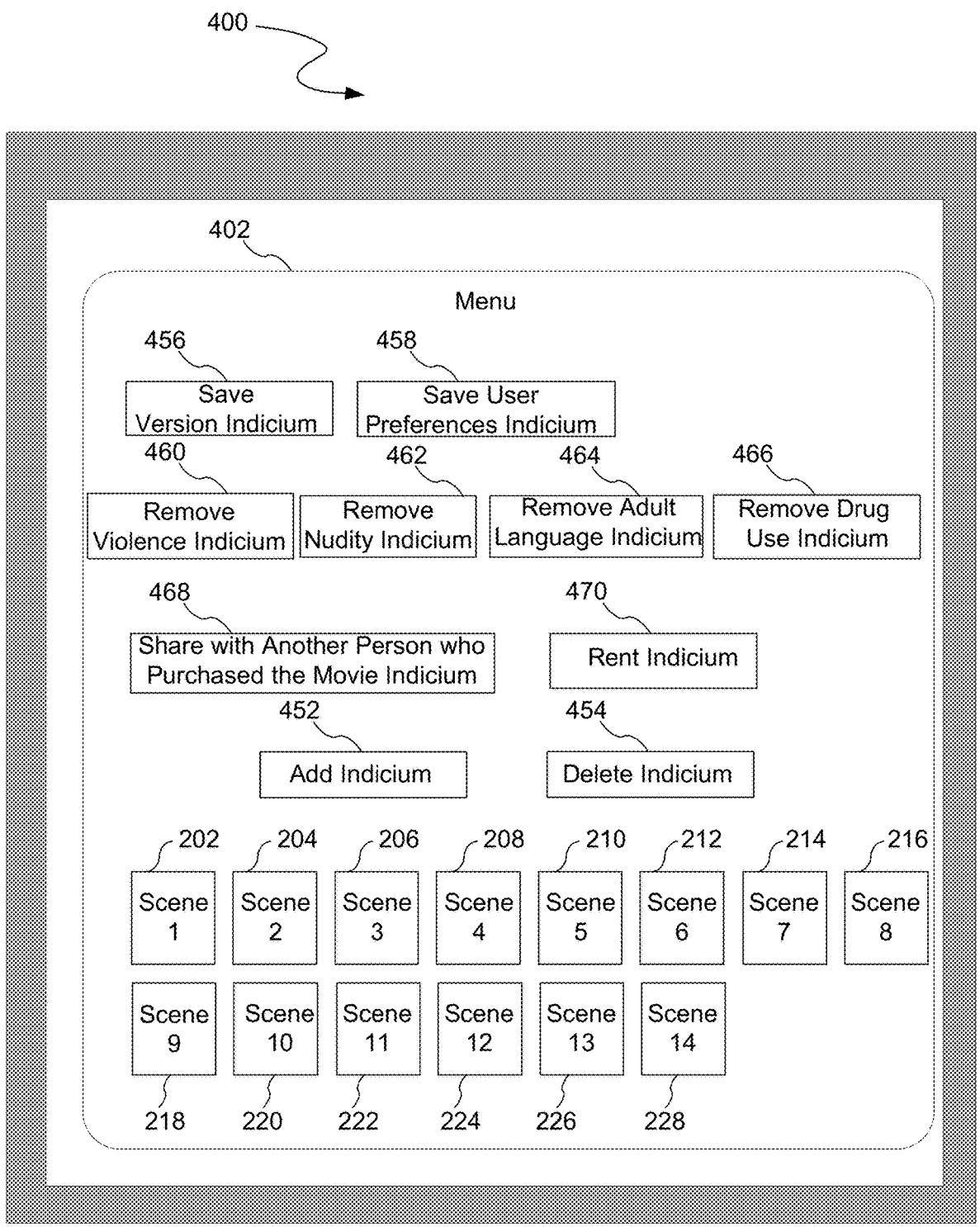

FIGS. 4A and 4B illustrate a display 400 that is utilized to access a menu 402. The menu 402 includes an interface that allows the user to provide an input to customize the content 110.

FIG. 4A illustrates the customization input as a preview indicium 404. After a user has selected the preview indicium 404, a display of the various scenes (such as a snapshot of the beginning of each scene) that differ between the versions of the content 110 are indicated in the menu 404. A user may select different scenes to preview. For example, a user may want to quickly know which scenes are in the version B 114 that are not in the version A 112, e.g., the thirteenth scene 226 and the fourteenth scene 228. The MPAA, movie studios, editors, or other person or entity may identify certain scenes in a movie as containing violence, nudity, adult language, drug use, etc. Instead of having to watch both the version A 112 and the version B 114 in their entireties, the user may watch a preview that includes only the differing scenes. The user may then determine the age appropriateness of the differing scenes. As a result, the user may determine which version of the content 110, e.g., the version A 112 or the version B 114, is age appropriate.

FIG. 4B illustrates the customization input as a plurality of customization indicia such as an add indicium 452 and a delete indicium 454. A user can drag and drop each scene to the add indicium 452 or delete indicium 454, or each scene can have its own add or delete indicium. A user may add or delete scenes from the version B 114 illustrated in FIG. 2 to customize an age appropriate version of the content 110. Rather than rely on ratings of various versions of the content 110 that are determined by others, the user may decide for himself or herself which portions of the version B 114 are age appropriate. For example, the version B 114 may be an adult version of the content 110 that can be customized by parents into a child version according to their own preferences for their children. As an example, parents may choose to delete the eleventh scene 222, the twelfth scene 224, the thirteenth scene 226, and the fourteenth scene 228. As a result, the customized version includes the first scene 202, the second scene 204, the third scene 206, the fourth scene 208, the fifth scene 210, the sixth scene 212, the seventh scene 214, the eighth scene 216, the ninth scene 218, and the tenth scene 220.

The plurality of customization indicia is not limited to the add indicium 452 and the delete indicium 454. Save indicia such as a save version indicium 456 and a save user preferences indicium 458 may also be utilized. Various other customization indicia may be utilized. For example, a remove violence indicium 460 may be utilized to remove scenes with violence, a remove nudity indicium 462 may be utilized to remove scenes with nudity, a remove adult language indicium 466 may be utilized to remove scenes with adult language, and a remove drug use indicium 468 may be utilized to remove scenes with drug use. In an alternative aspect, block indicia rather than deletion indicia may be utilized. For example, a block indicium may be utilized to block, rather than delete, certain scenes or audio content, such as adult language. Other indicia such as a sharing indicium 468 to share with another person who purchased the movie and a rent indicium 470 to rent the movie may also be utilized.

Rent, Sell or Recommend to New Users

In one aspect, the customized version may be rented, sold, or recommended by one user to other users via a web site, a mobile application, or other platform. For each rental or sale, a royalty may then be provided back to the studio that distributed the content 110. As an example, a user may customize a version of the content 110 and then recommend that version to friends or other parents via a social media web site or platform. This can increase revenue for movie studios.

Share with Users Who Previously Purchased Content

In another aspect, the customized version (or data indicating which scenes are in the customized version) is shared by one user with other users who purchased the content 110, so that the other users may also utilize the customized version. A system may track which users have purchased the content 110. The users may use the same type of device (Blu-ray disc player) as the first user, or different devices (laptops, disc players, tablet computers, smart TVs).

Saving User Preferences

In yet another aspect, the user preferences are saved automatically. As an example, a user may indicate a preference for scenes without explicit language, nudity, sex, blood, drug use, and/or graphic violence. That user preference may be saved so that other content is automatically customized based upon that user preference.

Also, the user preferences may be saved to a particular device. As an example, a set top box in the family room may have a user preference for G rated movies whereas a set top box in the parents' room may have a user preference of PG, PG-13, and R rated movies.

Learning User Preferences

In another aspect, a system has learning functionality that automatically determines the user preferences based upon previous user customization. For instance, the user may have previously removed a significant quantity of scenes with explicit language without providing a user input that indicated that removal of scenes with explicit language was the preference. The system may deduce that preference from the user actions of deleting scenes with explicit language and save that deduced preference for automatic customization of other content.

Parents of young children may prefer a shorter version of a movie, so parents may use the features described herein to create a shorter version of the movie.

The features described herein may allow the user to select a different ending to play.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
providing, to a user from a data storage device, a first version of an audiovisual content and a second version of the audiovisual content, wherein the second version has one or more first scenes and one or more second scenes, wherein the first version has the one or more first scenes while the one more second scenes are not included in the first version, and wherein the one more second scenes are deemed not appropriate for a type of viewer without a determination as to whether the one more second scenes are appropriate for the user; and
providing a first menu to allow the user to select the first version or the second version to play on a device, and a second menu to allow the user to select only the one more second scenes, which are not included in the first version, to play on the device.

2. The method of claim 1, wherein the first version has a rating associated with content intended for children.

3. The method of claim 1, wherein the second version has a rating associated with content intended for teenagers.

4. The method of claim 1, further comprising:
providing a third menu to allow the user to recommend the first version or the second version to another user.

5. The method of claim 1, wherein the first version, the second version, the first menu and the second menu are provided to the user from a disc being the data storage device.

6. The method of claim 1, wherein the first version, the second version, the first menu and the second menu are provided to the user from the data storage device via a website.

7. The method of claim 1, wherein the first version, the second version, the first menu and the second menu are provided to the user via a mobile device application of the device.

8. The method of claim 1, wherein the one or more second scenes include at least one of violence, sexual content, drug use, or adult language.

9. The method of claim 1, further comprising:
providing a third menu to allow the user to remove at least a scene from the one or more first scenes or the one or more second scenes.

10. The method of claim 1, further comprising:
providing a third menu to allow the user to remove an audio segment of the audiovisual content.

11. A data storage device comprising:
a first version of an audiovisual content;
a second version of the audiovisual content, wherein the second version has one or more first scenes and one or more second scenes, wherein the first version has the one or more first scenes while the one more second scenes are not included in the first version, and wherein the one more second scenes are deemed not appropriate for a type of viewer without a determination as to whether the one more second scenes are appropriate for the user; and
a first menu to allow the user to select the first version or the second version to play on a device; and
a second menu to allow the user to select only the one more second scenes, which are not included in the first version, to play on the device.

12. The data storage device of claim 11, wherein the first version has a rating associated with content intended for children.

13. The data storage device of claim 11, wherein the second version has a rating associated with content intended for teenagers.

14. The data storage device of claim 11, further comprising:
a third menu to allow the user to recommend the first version or the second version to another user.

15. The data storage device of claim 11, wherein the first version, the second version, the first menu and the second menu are provided to the user from a disc being the data storage device.

16. The data storage device of claim 11, wherein the first version, the second version, the first menu and the second menu are provided to the user from the data storage device via a website.

17. The data storage device of claim 11, wherein the first version, the second version, the first menu and the second menu are provided to the user via a mobile device application of the device.

18. The data storage device of claim 11, wherein the one or more second scenes include at least one of violence, sexual content, drug use, or adult language.

19. The data storage device of claim 11, further comprising:
a third menu to allow the user to remove at least a scene from the one or more first scenes or the one or more second scenes.

20. The data storage device of claim 11, further comprising:
a third menu is provided to allow the user to remove an audio segment of the audiovisual content.

* * * * *